United States Patent
Rydbeck

Patent Number: 6,163,693
Date of Patent: Dec. 19, 2000

[54] AUTOMATED WARRANTY REGISTRATION

[75] Inventor: Nils R. C. Rydbeck, Cary, N.C.

[73] Assignee: Ericsson, Inc., Research Triangle Park, N.C.

[21] Appl. No.: 08/991,907

[22] Filed: Dec. 16, 1997

[51] Int. Cl.[7] .............................. H04Q 7/20; H04Q 7/38
[52] U.S. Cl. ..................... 455/418; 455/419; 455/420; 455/414; 455/412; 455/550; 364/479.06; 364/479.07
[58] Field of Search ...................... 455/466, 418, 455/420, 411, 435, 432, 422, 575, 90, 550, 566, 409, 412, 414, 403, 419; 364/479.06, 479.07

[56] References Cited

U.S. PATENT DOCUMENTS

| | | | |
|---|---|---|---|
| 5,386,468 | 1/1995 | Akiyama et al. | 455/418 |
| 5,894,596 | 4/1999 | Hayes, Jr. | 455/418 |

FOREIGN PATENT DOCUMENTS

| | | |
|---|---|---|
| WO 97/49030 | of 1997 | WIPO. |
| WO 98/07288 | of 1998 | WIPO. |

OTHER PUBLICATIONS

Method & Apparatus for Establishing Activation Date for a Cellular Telephone, U.S. Pat. App. No. 08/698,803, filed Aug. 16, 1996.

*Primary Examiner*—Fan Tsang
*Assistant Examiner*—Keith Ferguson
*Attorney, Agent, or Firm*—Coats & Bennett, PLLC

[57] ABSTRACT

A method for determining when a wireless communications device's warranty period begins uses the wireless communications device's first use date as a proxy for the start of the warranty period. After being powered-on, the wireless communications device checks a non-volatile warranty registration status-flag. If that flag indicates that the wireless communications device has not previously registered, the wireless communications device sends a unique identifier, such as a serial number, to a warranty registration center. The warranty registration center stores the identifier with an associated registration date stamp. The wireless communications device then changes the warranty registration status flag to indicate that the device has been registered for warranty purposes. Once this automated warranty registration is complete, the wireless communications device proceeds with normal operation. The recorded first use date may be used as the start of the warranty period.

23 Claims, 7 Drawing Sheets

AUTOMATED WARRANTY REGISTRATION

FIELD OF INVENTION

The present invention relates generally to the communications field and, in particular, to automated warranty registration for wireless communications devices.

BACKGROUND OF THE INVENTION

Wireless communications devices, such as cellular telephones, have become extremely popular with business and personal users. The manufacturers of wireless communications devices typically provide a time-limited warranty with their products. The warranty typically guarantees to purchasers that the manufacturer will repair or replace a defective wireless communications device for free during a set period of time, such as one year from purchase. After the warranty period has expired, any repair costs are the financial responsibility of the wireless communications device owner, not the manufacturer. Because costs of warranty repair and replacement are significant, manufacturers are keenly interested in determining whether the warranty period has expired or not.

Most warranty periods for wireless communications devices begin to run at the time of purchase. Customers usually purchase wireless communications devices from a retail outlet. After purchase, a cellular telephone network service provider activates the telephone to allow the phone to access the service provider's wireless communications system.

Because manufacturers generally do not own or control the retail outlets and service providers, the manufacturer typically loses track of the wireless communications device once the manufacturer ships the device to the retail outlet. As such, manufacturers have difficulty in determining when the wireless communications device is sold to a consumer. Several different methods and systems for tracking when a particular wireless communications device was first sold to a customer have been tried, but with limited success.

One approach is to require the purchaser of the wireless communications device to mail a warranty card to the manufacturer. This approach has met with consumer dissatisfaction and, because consumers are not required to return the warranty card in order to recover under the warranty, many fail to do so. Further, by accident or with fraudulent intent, the consumer may simply record the wrong date on the warranty card.

A second approach is to require the consumer to provide proof-of-purchase documentation such as a sales slip when requesting warranty service. This method, however, puts a considerable burden on the consumer to maintain and locate the sales slip some time after the purchase of the wireless communications device, and is therefore not well received by consumers.

A third approach is for the manufacturer to estimate the wireless communications device's sales date based on the device's known date of manufacture along with the average inventory time for a particular service provider or equipment vendor. This method has the disadvantage of highly dubious accuracy, and therefore frequently induces the manufacturer to err to the consumer's benefit in the spirit of good customer relations by providing warranty service long past the actual date on which the warranty should have expired.

Still another approach is for the wireless communications device to record its own start-of-service date in internal non-volatile memory. The manufacturer then reads this date when examining a wireless communications device returned for warranty service. This method, although clearly an improvement on the earlier methods, nevertheless has two disadvantages: (1) the user or service provider must enter the start-of-service date, or the wireless communications device must contain a calendar so that it has a sense of time and is therefore cognizant of its start-of-service date, and (2) the date held in non-volatile memory may be obliterated in the case of catastrophic failure, and may therefore be unavailable to the manufacturer at the time warranty service is requested.

These and other shortcomings of the prior art suggest that there remains the need for a simple, effective method for determining the warranty period for a wireless communications device.

SUMMARY OF THE INVENTION

The present method is a simple and effective method for determining when a warranty period for a wireless communications device begins. The wireless communications device's first use date is used as a proxy for the start of the warranty period. After being powered-on, the wireless communications device checks a non-volatile warranty registration status-flag. If that flag indicates that the wireless communications device has not previously registered, the wireless communications device sends a unique identifier, such as a serial number, to a warranty registration center. The warranty registration center stores the identifier with an associated warranty registration date stamp, preferably in a database, and sends a warranty registration acknowledgment back to the wireless communications device. The wireless communications device then changes the warranty registration status flag to indicate that the device has been registered for warranty purposes. Once this automated warranty registration is complete, the wireless communications device proceeds with normal operation. The recorded first use date is used as the start of the warranty period. Once the beginning of the warranty period is established, the expiration status of the warranty may be determined using conventional methods. Because the process is performed prior to normal operation of the wireless communications device, compliance with warranty registration will be more uniform. Further, because the process is automatic, it will impose little or no burden on the user and therefore consumer dissatisfaction may be avoided.

DETAILED DESCRIPTION

Figure 1:
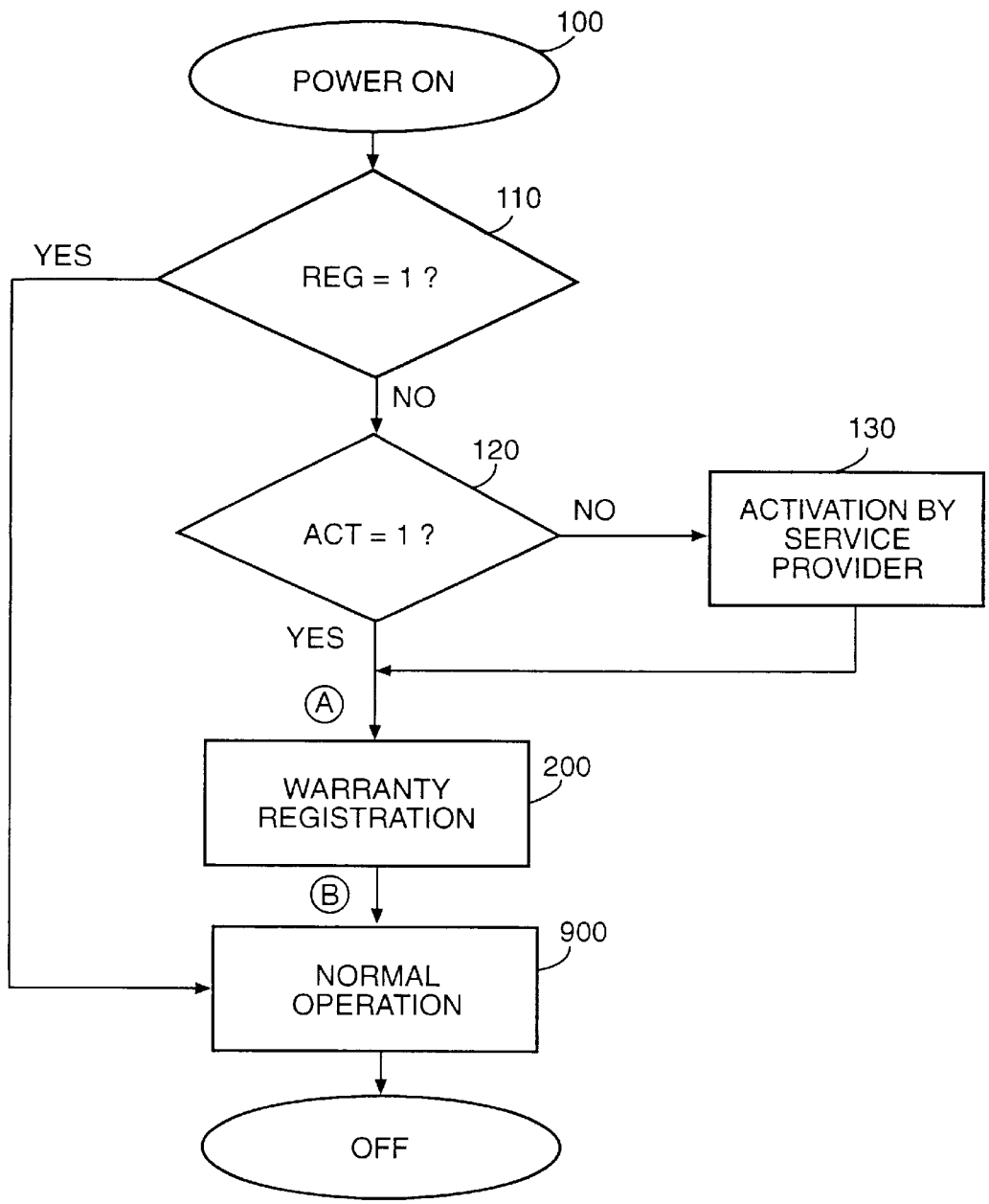
FIG. 1 is a simplified flow diagram of the overall operation of a wireless communications device in accordance with the present invention.

The present method uses the wireless communications device's first use date as a proxy for the start of the warranty period. After being powered-on, the wireless communications device checks two non-volatile status-flags; and if the wireless communications device has not done so already, the wireless communications device contacts the manufacturer so that the manufacturer can record the first use date. This first use date is used as the start of the warranty period.

For clarity, the present discussion will assume that the wireless communications device is a cellular telephone. However, it is to be understood that other wireless communications devices, such as personal communications assistants, pagers, and the like are also within the scope of the present invention.

Four different entities are typically involved with the sale and activation of a cellular telephone. The first is the manufacturer of the phone; the second is the retail outlet where the phone is sold; the third is the phone purchaser or user; and the fourth is the telecommunications service provider. Typically, these four entities are all separate, but in some instances the service provider may also serve as a retail outlet for phone sales.

As is well known in the art, when a phone is sold, it is not ready for use until the service provider "activates" the phone. During the activation process, the phone is provided with essential operating information which it stores in non-volatile memory. Once the phone is activated, the phone can access the service provider's telecommunications network.

Wireless communications systems, such as cellular telephone systems, may typically be divided into two broad classifications based on their method of operation: analog and digital. Analog systems transmit communications signals in an analog manner; an example of an analog system available in the United States is Advanced Mobile Phone System (AMPS). Digital systems transmit communications signals in a digital manner; an example of a digital system available in Europe is Groupe Speciale Mobile (GSM). In the United States, many wireless communications systems include mobile phones that are dual-mode, that is, the phones are able to operate in both analog and digital systems. An example of dual-mode phones are those compatible with Telecommunications Industry Association Interim Standard IS-136.

Under the prior art, unless the manufacturer also acts as the service provider (very unusual), the manufacturer lost track of the phone after the phone leaves the manufacturer's warehouse. That is, unless and until the phone was returned to the manufacturer for repair, the manufacturer typically did not know when or where the phone was first used, absent the user voluntarily supplying the information to the manufacturer.

In the present method, after being powered-on, the phone checks a non-volatile status-flag to determine whether it has already registered for warranty purposes with a warranty registration center 19. If not, the phone contacts the warranty registration center 19 so that the first use date can be recorded. The manufacturer can then use this first use date as the start of the warranty period.

Figure 2:
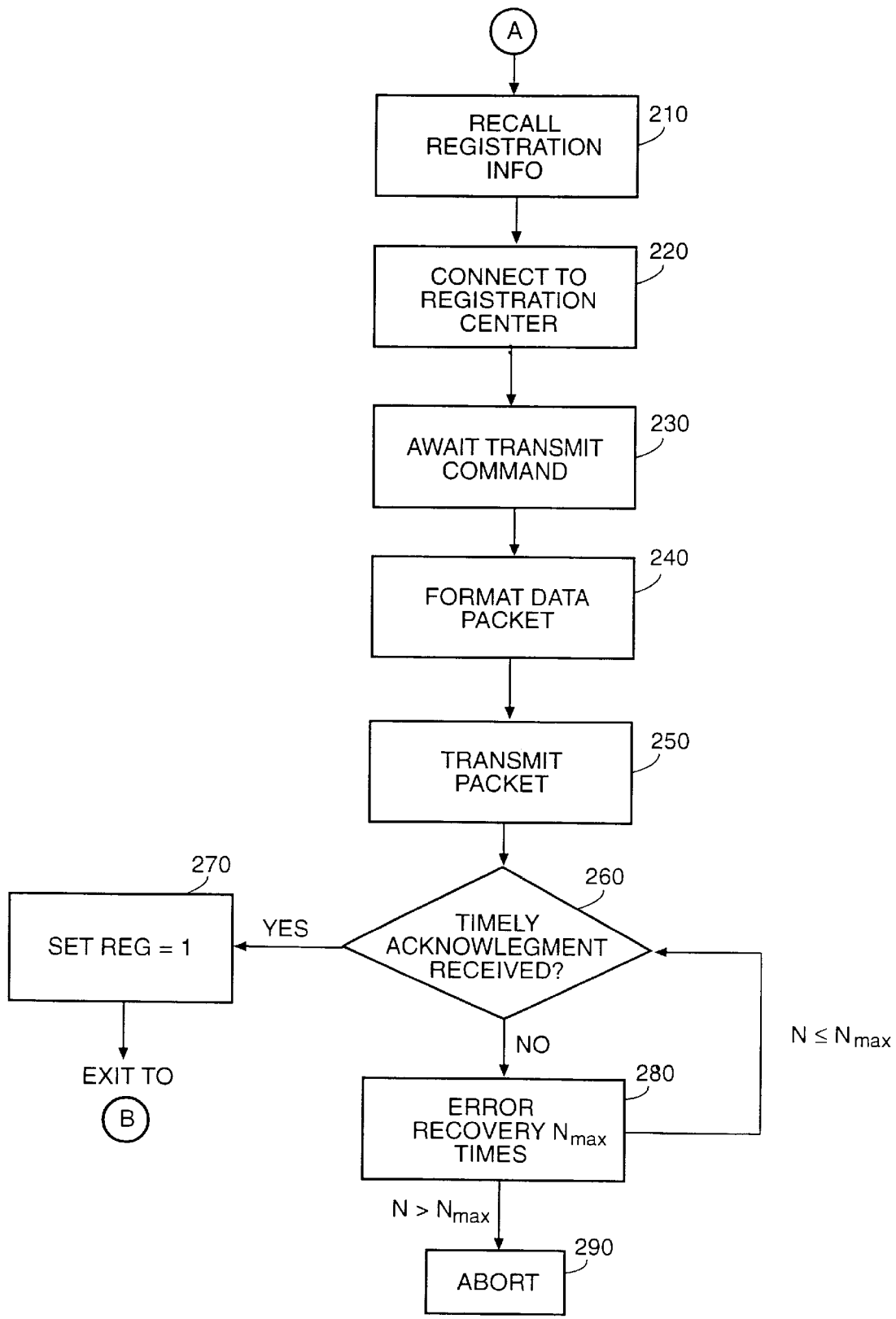
FIG. 2 is a simplified flow diagram of one embodiment of the registration process of box 200 of FIG. 1.
Figure 3:
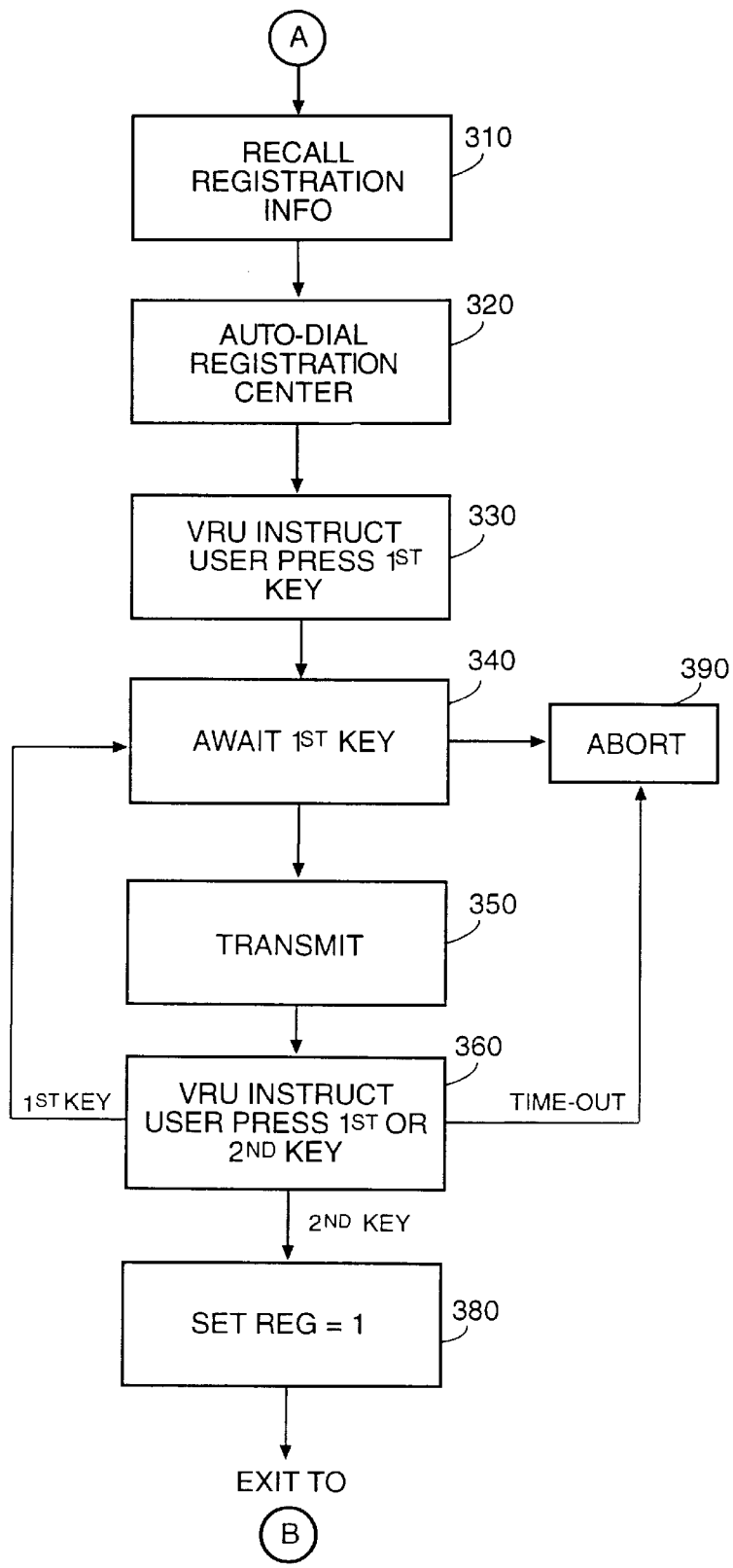
FIG. 3 is a simplified flow diagram of another embodiment of the registration process of box 200 of FIG. 1 for wireless communications devices that do not have packet or other data-communications capabilities.
Figure 4:
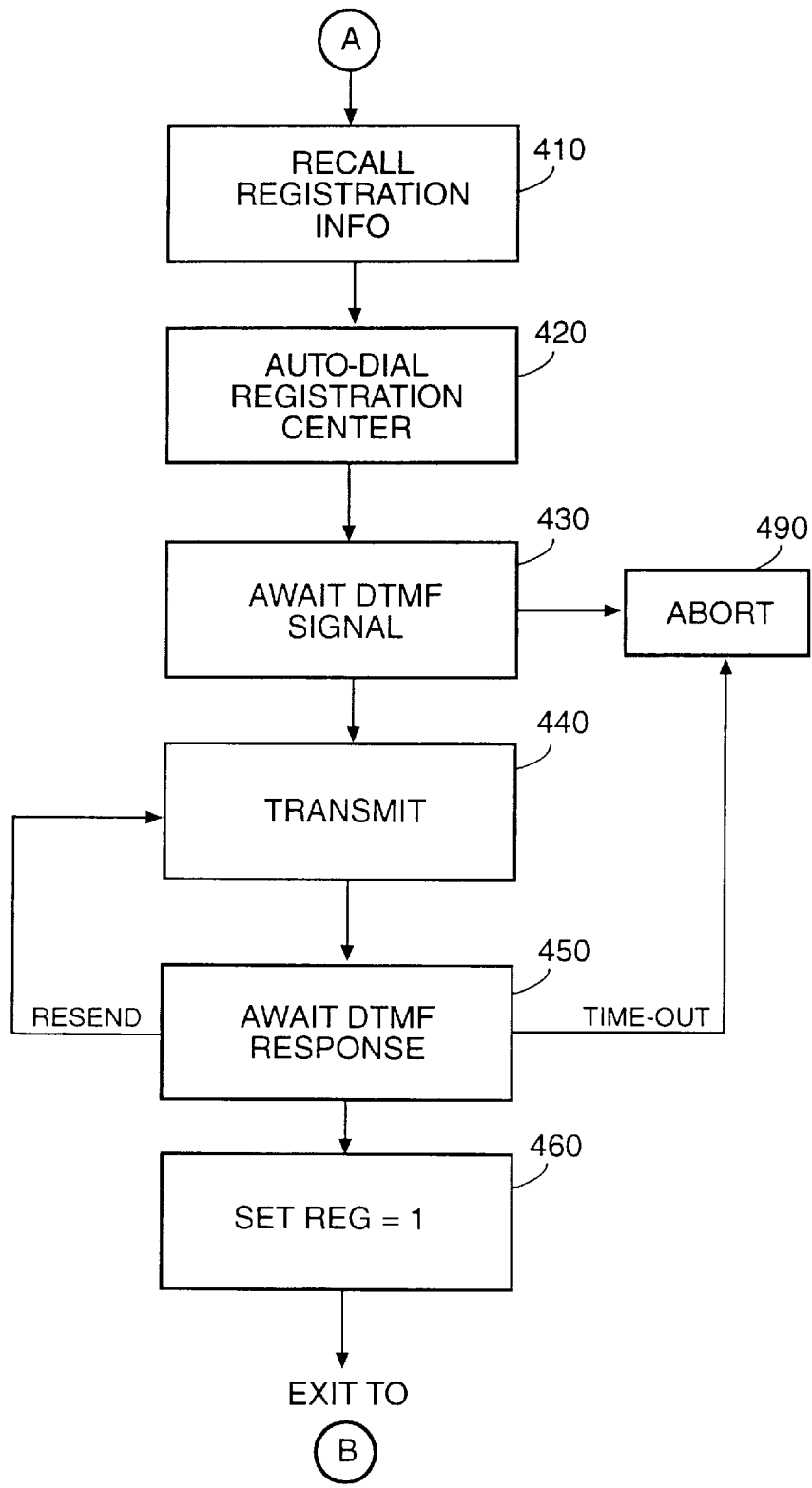
FIG. 4 is a simplified flow diagram of another embodiment of the registration process of box 200 of FIG. 1 for wireless communications devices that have a tone detector.
Figure 5:
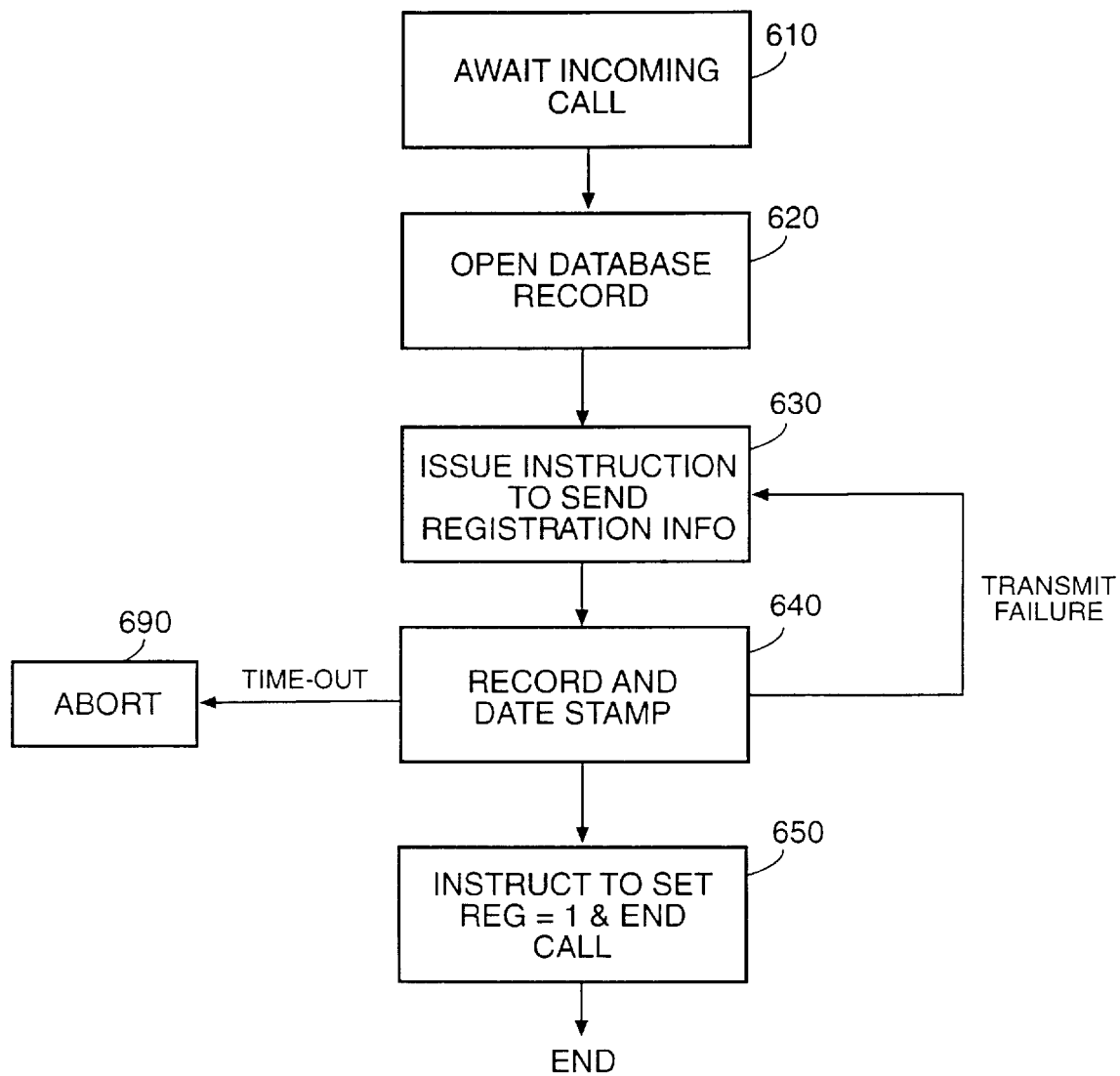
FIG. 5 is a simplified flow diagram of the operation of the registration center in accordance with the present invention.

The present method will be discussed in three sections. The first section covers the overall action of the phone (FIG. 1). The second section covers the phone's actions in more detail (FIGS. 2–4). The third section covers the actions of the warranty registration center 19 (FIG. 5).

In order to determine whether a phone has already registered for warranty purposes with the warranty registration center 19, the present method utilizes two status-flags: Warranty Registration (REG) and Activation (ACT). REG indicates the warranty registration status. ACT indicates whether the phone has been activated by a service provider. Both status-flags are stored in non-volatile memory internal to the phone. The non-volatile memory further includes an identifier (e.g., a serial number) and routing information for contacting a warranty registration center 19 in addition to the two status-flags. Of course, the non-volatile memory may also include other information. When the phone leaves the manufacturer, both status-flags are set to zero (false).

Referring now to FIG. 1, when the phone is powered-on (box 100), the phone checks flag REG to determine whether the phone has previously registered itself with the manufacturer for warranty purposes (box 110). If REG=1, indicating that the phone has previously registered, the phone proceeds with normal operation (box 900), that normal operation being well known in the art. If REG=0, then the phone checks flag ACT (box 120). If ACT=0, the phone must be initialized, also known as activated, by a service provider (box 130) in a manner well known in the art. If ACT=1 then the phone proceeds to register with the warranty registration center 19 (box 200) as described below. After successful warranty registration, the phone proceeds with normal operation (box 900). It should be noted that as part of a successful warranty registration procedure, status-flag REG will be set to 1.

To illustrate the process, assume a newly purchased phone is powered-on (box 100). At this point, both REG and ACT are set to 0, this being the settings supplied by the manufacturer. The phone will automatically check status-flag REG (box 110). Because REG is set to 0, the value of ACT will be checked (box 120). Because ACT is set to 0, the phone must be activated by a service provider (box 130). If the phone is powered-off at this point, no changes are made to flags REG and ACT, and the process repeats the next time the phone is powered-on (box 100). Now assume that the phone is properly activated by a service provider (box 130). At or near the end of the activation process, flag ACT is set to 1 to indicate that the phone has been activated. After activation, the phone proceeds to register with the warranty registration center 19 (box 200) to note the beginning of the warranty period. At or near the end of the process of box 200, flag REG is set to 1 to indicate that the phone has been registered. After warranty registration, the phone proceeds with normal operation (box 900). It should be noted that the phone will preferably use the service provider's communications network to contact the manufacturer; thus, it is desirable for the phone to be properly activated (box 130) before the phone attempts to contact the manufacturer for warranty registration (box 200).

If the process is interrupted after initialization (box 130) but before warranty registration is complete (point B), REG will remain set to 0, but ACT will be 1. In this case, at the next power-on (box 100), the phone will again attempt to register with the warranty registration center 19 (box 200) to note the beginning of the warranty period before proceeding with normal operation (box 900).

Once status-flag REG is set to 1, the phone will no longer attempt to contact the warranty registration center 19 for warranty registration purposes. Accordingly, when a user changes service provider, as is common practice, the phone will not attempt to re-register with the warranty registration center 19. Of course, the phone will still need to be activated by the "new" service provider using any commonly known method. Thus, unless the REG status-flag is reset to 0 during authorized repair, such as repair by or on behalf of the manufacturer, it is intended that status-flag REG will remain set to 1 for the remainder of the phone's life.

Referring now to FIG. 2, one embodiment of the process of box 200 is further explained. The algorithm shown in FIG. 2 is entered from point A in FIG. 1, and if successful returns to point B in FIG. 1. First, the phone recalls warranty registration information loaded by the manufacturer, preferably at the time of manufacture, from the phone's non-volatile memory (box 210). Warranty registration information includes an identifier unique to the phone, such as a serial number, and routing information for contacting the manufacturer. Examples of such routing information include a toll-free phone number, a Short Message Service (SMS) number, an internet access number, an e-mail address, and a web page address.

Next, the phone connects to the warranty registration center 19 (box 220). The phone then waits for a transmit command from the warranty registration center 19 (box 230). Once the command is received, a data packet which includes the phone's identifier is constructed (box 240) according to requirements of the chosen data-communications format and protocol description. In one preferred embodiment, the chosen data-communications format and protocol description are according to IS-136 R-data teleservices. For explanation of IS-136 R-data teleservices, see Chapter 7, Section 1, of Telecommunications Industry Association Interim Standard IS-136.1, revision A. The data packet includes routing information for directing the data packet to the warranty registration center 19 and payload information including the phone's unique identifier. The assembled packet is passed to the phone's physical layer for transmission to its destination (box 250).

The phone then waits for an acknowledgment (box 260) from the warranty registration center 19 indicating that the data packet has been successfully received and processed. If no such acknowledgment is timely forthcoming, the phone invokes its error-recovery mechanism (box 280) for pre-set number of re-transmissions of the packet, $N_{max}$. If none of these re-transmissions is successful, the procedure aborts (box 290). If a timely acknowledgment is received, status-flag REG is set to 1 (box 260), indicating that the warranty registration with the warranty registration center 19 has been successful, and the process returns to FIG. 1 at Point B. Other embodiments of the present invention may employ other known error detection/correction methods native to the data-communications protocol being employed. It should be noted that other communications formats and protocols for data transmission, for example GSM, PCS, and IS-95, may be used equivalently and are encompassed hereby.

In another embodiment, the process described above is altered by deleting the wait for transmit command (box 230). For example, using SMS service, the phone may transmit the registration information as part of a datagram without waiting for a transmit command from the warranty registration center 19. Thereafter, the warranty registration center 19 may initiate a SMS response datagram to acknowledge that the data packet has been successfully received and processed (box 260).

An alternative embodiment of the process of box 200 shown in FIG. 3 may be used for phones that do not have packet or other data-communications capabilities, such as those operating in many analog wireless communications systems. The algorithm of FIG. 3 is entered from point A of FIG. 1, and returns if successful to point B of FIG. 1. In this embodiment, the phone recalls the aforementioned warranty registration information loaded by the manufacturer from the phone's non-volatile memory (box 310). Thereafter, using the routing information, the phone automatically establishes a connection with the warranty registration center 19 (box 320). This connection is preferably a voice connection via a toll-free phone number. Once the connection is established, a voice-response unit (VRU) at the warranty registration center 19 instructs the user to depress a first particular keyboard character (box 330), such as star (*). The depression of this key is noted by electronic logic within the phone (box 340), and is interpreted as permission to proceed. The phone's unique identifier is then transmitted automatically by the phone to the warranty registration center 19 (box 350). To accomplish this, the phone preferably uses its native Dual-Tone Multi-Frequency (DTMF) generator to generate and transmit the standard DTMF tone-pair corresponding to each of the digits of the identifier, along with appropriate error coding.

If the warranty registration center 19 does not successfully receive the message (as indicated, for example, by time-out, parity error, or the wrong number of received digits), the warranty registration center's VRU instructs the user to enter the first particular keyboard character again (box 360). As shown in FIG. 3, this results in a re-transmission of the identifier.

Upon successful reception of the message by the warranty registration center 19, the warranty registration center's VRU instructs the user to enter a second particular keyboard character (box 360), such as the pound sign (#). When logic within the phone detects this entry, status-flag REG is set to 1 (box 380), denoting successful warranty registration, the call is terminated, and the process returns to FIG. 1 at Point B.

As indicated by FIG. 3, if the phone encounters a time-out situation while waiting for the user to press a key (box 330) or the VRU to respond (box 360), the phone aborts the registration procedure (box 390).

Another alternative embodiment shown in FIG. 4 is used for phones operating in analog systems when the phone is equipped with a DTMF detector, or other tone detector. The warranty registration center 19 guides the phone through the steps of FIG. 4 by sending DTMF tones—rather than VRU audio messages—from the warranty registration center 19 to the phone.

The algorithm of FIG. 4 is entered from point A of FIG. 1, and returns if successful to point B of FIG. 1. In this embodiment, the phone recalls the aforementioned warranty registration information loaded by the manufacturer from the phone's non-volatile memory (box 410). Thereafter, using the routing information, the phone automatically establishes a connection with the warranty registration center 19 (box 420). Once the connection is established, the phone waits for a DTMF signal from the warranty registration center 19 (box 430). Once the DTMF signal is received, the phone's identifier is then transmitted automatically by the phone to the warranty registration center 19 (box 440). As with the procedure of FIG. 3, the phone uses its native DTMF generator to generate and transmit the standard DTMF tone-pair corresponding to each of the digits of the identifier, along with appropriate error coding. The phone then waits for a DTMF signal from the warranty registration center 19 (box 450), indicating successful warranty registration.

If the warranty registration center 19 does not successfully receive the message, the warranty registration center 19 requests a re-transmission of the identifier (box 440). If the warranty registration center 19 successfully receives the message, the warranty registration center 19 instructs the phone to set the REG status-flag to 1 (box 460) denoting successful registration, the call is terminated, and the process returns to FIG. 1 at point B.

As indicated by FIG. 4, if the phone encounters a time-out situation while waiting for a DTMF signal from the warranty registration center 19 (box 430 or box 450), the phone aborts the registration procedure (box 490).

With respect to the method of FIG. 3, the method of FIG. 4 has the advantage of transparency to the user, but the disadvantage of added complexity in that the phone requires a tone detector such as a DTMF detector.

In one preferred embodiment, with respect to FIGS. 2–4, normal operation of the phone is allowed after an abort (box 290, box 390, or box 490), so as to minimize user dissatisfaction if the warranty registration center 19 is temporarily dysfunctional or the like. Alternatively, after an abort (box 290, box 390, or box 490), the phone may allow a fixed number of power-ups to normal operation to occur before requiring a successful warranty registration.

Turning now to FIG. 5, the actions at the warranty registration center 19 are shown. Preferably, the warranty registration center 19 includes a computer that is date aware and a database for storing identifier-date registration information. The warranty registration center 19 first waits for an incoming call or equivalent, such as the arrival of a packet data message (box 610). When the call is received, a database record is opened (box 620). The warranty registration center 19 then instructs the phone to begin sending the warranty registration information (box 630). As described above, this instruction may be done automatically or may be achieved through a VRU. Alternatively, the process of box 630 may be omitted, such as when the contact with the warranty registration center 19 is via a packet data message. The heart of this process is the recording of the phone's unique identifier (e.g., serial number) with an accompanying date stamp at the warranty registration center 19 (box 640). Once the identifier is recorded, the database record is closed and the phone is instructed to set status-flag REG to 1 (box 650). Robustness may be built into the process by having the warranty registration center 19 re-request the warranty registration information (box 630) in the event of a transmission failure such as parity or time-out failure. Further, the process may abort (box 690) after a set number of failures.

It should be noted that if the database record opened has an indicator that matches an existing record, meaning that the phone has already been registered, the new data is preferably disregarded and the existing database record is not changed. To avoid problems with repaired phones, when the manufacturer wishes to restart the warranty period, the manufacturer will either clear the appropriate database record or alter the date stamp accordingly.

The start of the warranty period for a particular phone is determined by looking in the warranty registration center's database at the date stamp associated the phone's identifier. It is understood that the date stamp reflects the first use date rather than the purchase date. However, it is believed that users typically have cellular phones activated very shortly after purchasing them. As such, it is typical that the purchase date and first activation date will be the same. At most, the indicated start of the warranty period will be only a few days after the actual purchase date. Once the beginning of the warranty period is established, the expiration status of the warranty may be determined using conventional methods.

The discussion above has assumed that the warranty registration center 19 is operated by the phone's manufacturer. However, the present invention also encompasses situations where warranty registration centers 19 are owned and/or operated by third parties, i.e. parties other than the phone user or the phone manufacturer. Other than the party owning and/or operating the warranty registration center 19, the description given above would apply.

Figure 6:
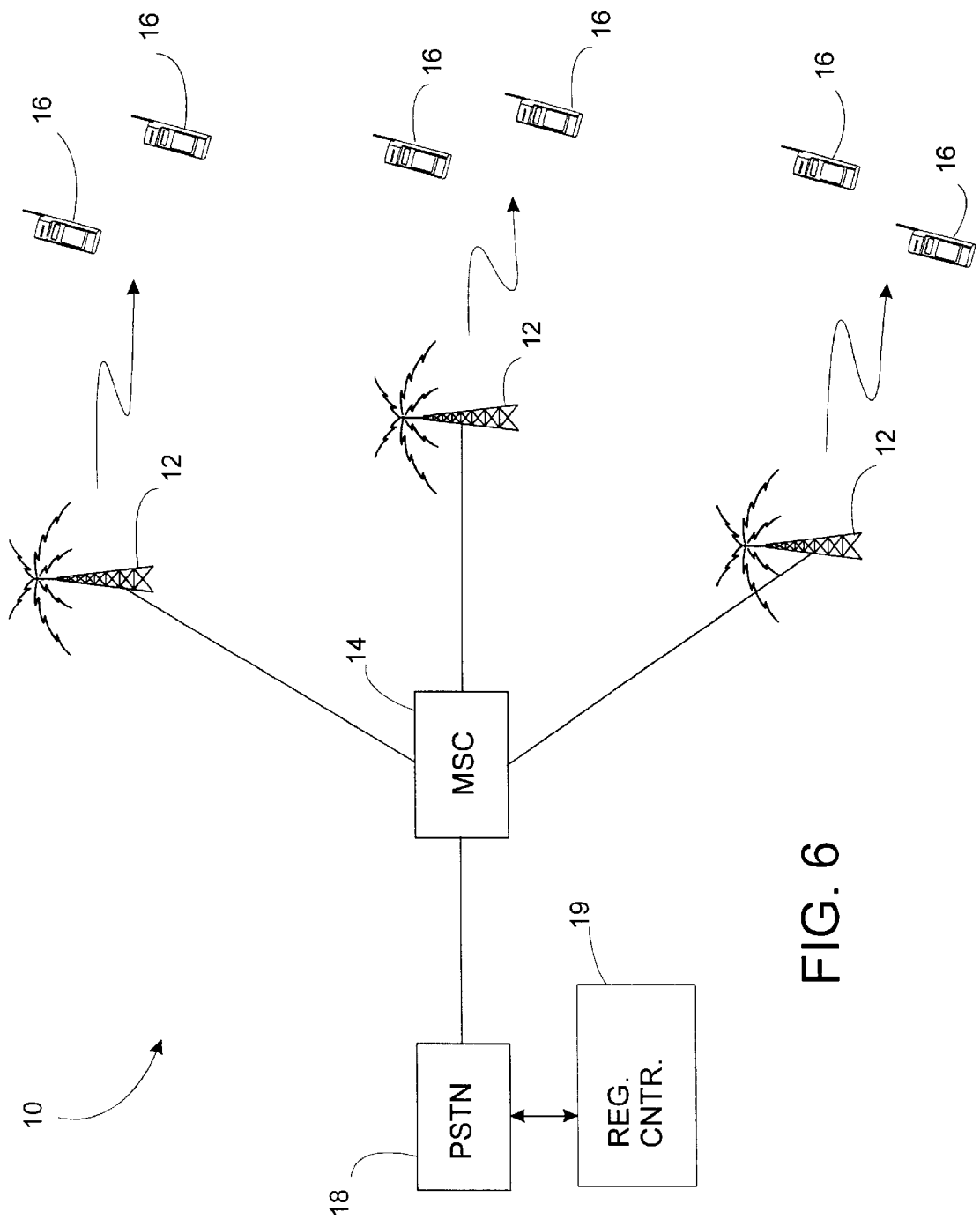
FIG. 6 is a simplified representation of a cellular telephone wireless communications system.

One preferred embodiment of a wireless communications system and mobile telephone suitable for practicing the method described above are shown in FIGS. 6 and 7. Referring to FIG. 6, a wireless communications system, such as a cellular phone system, is indicated generally by the numeral 10 and comprises a plurality of base stations 12 which are connected via a mobile services switching center (MSC) 14 to a terrestrial communications network such as the Public Switched Telephone Network (PSTN) 18. Each base station 12 is located in and provides service to a geographic region referred to as a cell. In general, there is one base station 12 for each cell within a given system 10. Within each cell, there may be a plurality of mobile units 16 that communicate via radio links with the base station 12. Base stations 12 allow the users of the mobile units 16 to communicate with other mobile units 16, or with users connected to the PSTN 18. The MSC 14 routes calls to and from the mobile units 16 through the appropriate base station 12. A warranty registration center 19 communicates with the MSC 14 via the PSTN 18. Alternatively, the warranty registration center 19 may communicate directly with, or be part of, the MSC 14.

Figure 7:
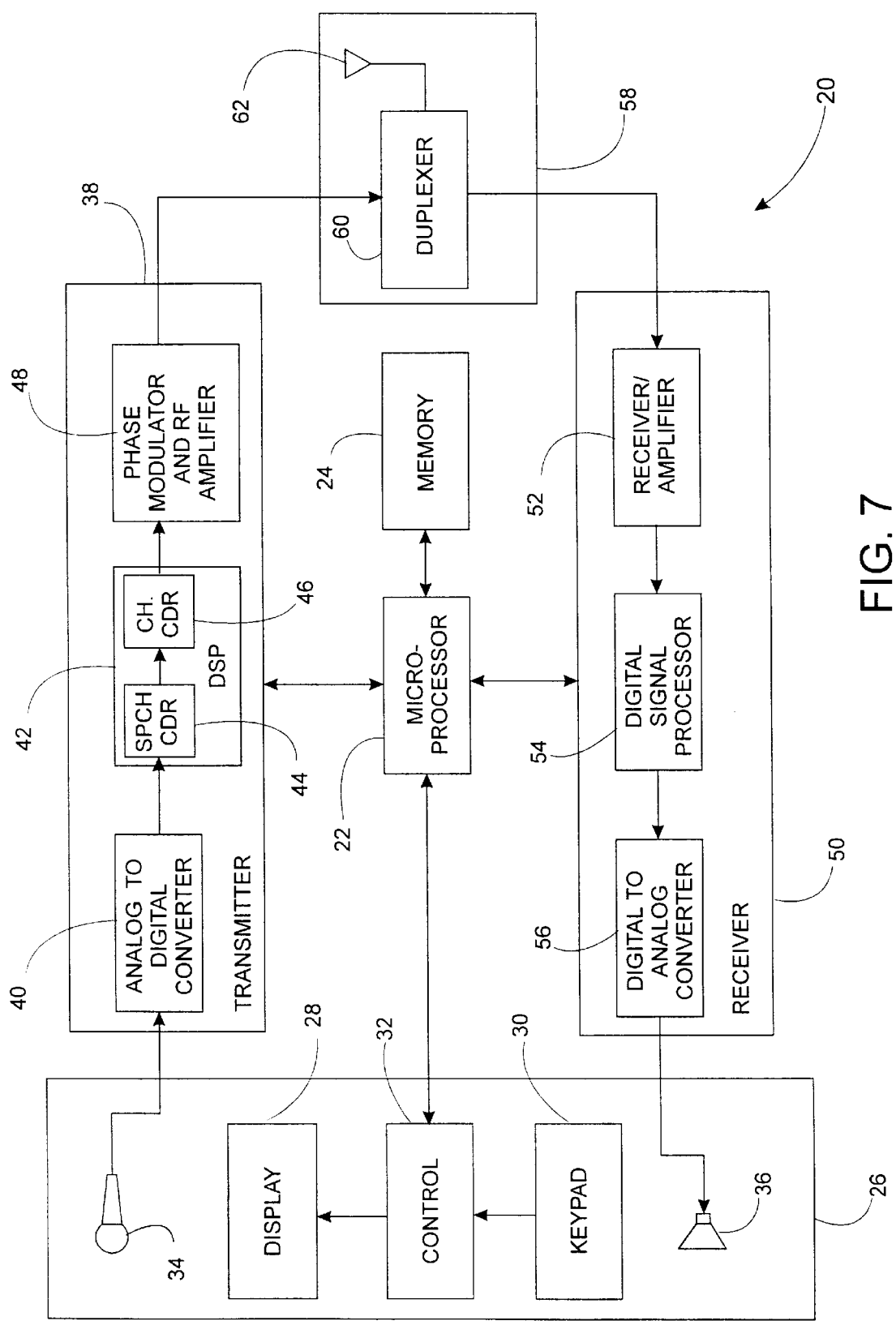
FIG. 7 is a block diagram of a typical mobile unit of the present invention.

FIG. 7 is a block diagram of a typical mobile unit 16 that uses the automatic warranty registration method of the present invention. The mobile unit 16 shown in FIG. 7 is a fully functional radio transceiver 20 capable of transmitting and receiving digital signals. The transceiver 20 includes a microprocessor 22, an operator interface 26, a transmitter 38, the receiver 50, and an antenna assembly 58.

The operator interface 26 typically includes a display 28, keypad 30, control unit 32, microphone 34, and speaker 36. The display 28 allows the operator to see dialed digits, call status, and other service information. The keypad 30 allows the operator to dial numbers, enter commands, and select options. The control unit 32 interfaces the display 28 and keypad 30 with the microprocessor 22. The microphone 34 receives audio signals from the user and converts the audio signals to analog signals. Speaker 36 converts analog signals from the receiver 50 to audio signals which can be heard by the user.

The analog signals from the microphone 34 are applied to the transmitter 38. The transmitter 38 includes an analog to digital converter 40, a digital signal processor 42, and a phase modulator and RF amplifier 48. The analog to digital converter 40 changes the analog signals from the microphone 34 into a digital signal. The digital signal is passed to the digital signal processor (DSP) 42 which contains a speech coder 44 and channel coder 46. The speech coder 44 compresses the digital signal and the channel coder 46 inserts error detection, error correction and signaling information. The DSP 42 may include, or may work in conjunction with, a DTMF tone generator (not shown). The compressed and encoded signal from the digital signal processor 42 is passed to the phase modulator and RF amplifier 48 which are shown as a combined unit in FIG. 7. The modulator converts the signal to a form which is suitable for transmission on an RF carrier. The RF amplifier then boosts the output of the modulator for transmission via the antenna assembly 58.

The receiver 50 includes a receiver/amplifier 52, digital signal processor 54, and a digital to analog converter 56. Signals received by the antenna assembly 58 are passed to the receiver/amplifier 52 which shifts the frequency spectrum and boosts the low level RF signal to a level appropriate for input to the digital signal processor 54.

The digital signal processor 54 typically includes an equalizer to compensate for phase and amplitude distortions in the channel corrupted signal, a demodulator for extracting bit sequences from the received signal, and a detector for determining transmitted bits based on the extracted sequences. A channel decoder detects and corrects channel errors in the received signal. The channel decoder also includes logic for separating control and signaling data from speech data. Control and signaling data is passed to the microprocessor 22. Speech data is processed by a speech decoder and passed to the digital to analog converter 56. The digital signal processor 54, may include, or may work in conjunction with, a DTMF tone detector (not shown).

The digital to analog converter 56 converts the speech data into an analog signal which is applied to the speaker 36 to generate audible signals which can be heard by the user.

The antenna assembly 58 is connected to the RF amplifier of the transmitter 38 and to the receiver/amplifier 52 of the receiver 50. The antenna assembly 58 typically includes a duplexer 60 and an antenna 62. The duplexer 60 permits full duplex communications over the antenna 62, as may be required for analog or dual-mode operation.

The microprocessor 22 coordinates the operation of the transmitter 38 and the receiver 50. This coordination includes power control, channel selection, timing, as well as a host of other functions. The microprocessor 22 inserts signaling messages into the transmitted signals and extracts signaling messages from the received signals. The microprocessor 22 responds to any base station commands contained in the signaling messages, and implements those commands. When the user enters commands via the keypad 30, the commands are transferred to the microprocessor 22 for action. Memory 24 stores and supplies information at the direction of the microprocessor 22 and preferably includes both volatile and non-volatile portions.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method for automatic warranty registration of a wireless communications device, comprising:
   a) setting a warranty registration status flag in said wireless communications device to a first value indicating that said wireless communications device has not been previously registered;
   b) checking said warranty registration status flag in response to the wireless communications device being powered up;
   c) sending a unique identifier from said wireless communications device to a warranty registration center if said warranty registration status flag is said first value;
   d) storing said identifier with an associated registration date at said warranty registration center; and
   e) changing said warranty registration status flag to a second value indicating that said wireless communications device has been registered.

2. The method of claim 1 further including receiving a registration acknowledgment from said warranty registration center at said wireless communications device before changing said warranty registration status flag to said second value.

3. The method of claim 1 further comprising measuring a warranty period for said wireless communications device from said registration date.

4. The method of claim 1 further comprising:
   a) setting an activation status flag in said wireless communications device to a first value indicating that said wireless communications device has not been previously activated;
   b) activating said wireless communications device; and
   c) thereafter changing said activation status flag to a second value indicating that said wireless communications device has been activated.

5. The method of claim 1 further including:
   a) storing routing information in said wireless communications device;
   b) recalling said routing information; and
   c) establishing a connection between said wireless communications device and said warranty registration center based on said routing information.

6. The method of claim 1 wherein said identifier is an electronic serial number of a cellular telephone.

7. The method of claim 1 wherein the wireless communications device manufacturer performs said setting of said warranty registration status flag to said first value.

8. The method of claim 1 wherein said warranty registration center includes a plurality of computers at dispersed locations.

9. The method of claim 1 wherein said warranty registration center includes a voice response unit and wherein said user responds to said voice response unit.

10. The method of claim 1 wherein said sending of said identifier is via a dual-tone multi-frequency generator.

11. The method of claim 1 wherein said wireless communications device includes a dual-tone multi-frequency detector and said wireless communications device responds to commands from said warranty registration center via said dual-tone multi-frequency detector.

12. The method of claim 1 further including operating said wireless communications device in a wireless communications system and wherein said sending of said identifier is via said wireless communications system.

13. The method of claim 12 wherein said wireless communications system is one of a DAMPS, PCS, GSM, CDMA, or digital type system.

14. The method of claim 12 wherein said wireless communications system is an analog system.

15. A method for automatic warranty registration of a wireless communications device, comprising:
   a) setting a warranty registration status flag in said wireless communications device to a first value indicating that said wireless communications device has not been previously registered;
   b) storing warranty registration information in said wireless communications device, said warranty registration information including a unique identifier for said wireless communications device and routing information;
   c) thereafter checking said warranty registration status flag in response to the wireless communications device being powered up;
   d) recalling said routing information;

e) thereafter sending, based on said routing information, said identifier from said wireless communications device to said warranty registration center if said warranty registration status flag is said first value;

f) receiving said identifier at said warranty registration center;

g) storing said identifier with an associated registration date at said warranty registration center;

h) thereafter changing said warranty registration status flag to a second value indicating that said wireless communications device has been registered.

16. The method of claim 15 further comprising:

a) setting an activation status flag in said wireless communications device to a first value indicating that said wireless communications device has not been previously activated by a service provider;

b) activating said wireless communications device; and c) thereafter changing said activation status flag to a second value indicating that said wireless communications device has been activated.

17. The method of claim 15 further comprising measuring a warranty period for said wireless communications device from said registration date.

18. The method of claim 15 wherein said routing information is a toll-free phone number.

19. The method of claim 15 wherein said identifier is a serial number.

20. The method of claim 15 wherein said wireless communications system is one of a DAMPS, PCS, GSM, CDMA, or digital type system.

21. The method of claim 15 wherein said warranty registration center includes a voice response unit and wherein said user responds to said voice response unit.

22. The method of claim 15 wherein said sending of said identifier is via a dual-tone multi-frequency generator.

23. The method of claim 15 wherein said wireless communications device includes a dual-tone multi-frequency detector and said wireless communications device automatically responds to commands from said warranty registration center via said dual-tone multi-frequency detector.

* * * * *